United States Patent [19]

Devio et al.

[11] Patent Number: 4,747,670

[45] Date of Patent: May 31, 1988

[54] ELECTROSTATIC DEVICE AND TERMINAL THEREFOR

[75] Inventors: John L. Devio, Adams; Charles G. Kalt, Williamstown, both of Mass.

[73] Assignee: Display Science, Inc., North Adams, Mass.

[21] Appl. No.: 840,138

[22] Filed: Mar. 17, 1986

[51] Int. Cl.[4] ........................ G02B 26/02; G09G 3/16

[52] U.S. Cl. .................................... 350/269; 350/266; 340/763

[58] Field of Search ............................... 350/266, 269; 340/815.04, 815.27, 763, 764

[56] References Cited

U.S. PATENT DOCUMENTS

| | | | |
|---|---|---|---|
| 4,094,590 | 6/1978 | Kalt | 350/269 |
| 4,105,294 | 8/1978 | Peck | 350/269 |
| 4,160,503 | 7/1979 | Ueda | 350/269 |
| 4,336,536 | 6/1982 | Kalt et al. | 340/783 |
| 4,468,663 | 8/1984 | Kalt | 350/269 |

*Primary Examiner*—John K. Corbin
*Assistant Examiner*—P. M. Dzierzynski
*Attorney, Agent, or Firm*—Arthur K. Hooks

[57] ABSTRACT

An electrostatic display device of electrically variable reflectivity has a fixed electrode with an insulated face and a conductive resilient sheet. One portion of the sheet is held against the insulated face so that when a voltage is applied between the fixed and the variable electrodes, the free end of the variable electrode is drawn to the insulated fixed electrode. An ancillary extension of the variable electrode is sandwiched and compressed between an elastomeric pad and a metal terminal to provide reliable electrical contact to the delicate variable electrode. The terminal is preferably one of an elongated and acutely curved contacting surface such as the surface of a small wire contacting the variable electrode at right angles to the direction of flexure when activated by appliction of voltage. Alternatively the terminal may consist of a plurality of elongated and convexly curved contacting surfaces, i.e. a corduroy-like metal surface. It is also preferred to include a thin layer of graphite particles compressed between the variable electrode and the terminal.

10 Claims, 2 Drawing Sheets

ELECTROSTATIC DEVICE AND TERMINAL THEREFOR

BACKGROUND

This invention relates to electrostatic devices and more particularly to such a device having a resilient electrostatically-controlled variable electrode comprised of a plastic sheet carrying a thin metal film on at least one face and an electrical connection made thereto.

A variety of such devices are known. They are usually configured in such a way that the variable electrode is attracted to and moves to become coadunate with a fixed electrode when a voltage source is connected between the variable and fixed electrodes.

For example, in my U.S. Pat. No. 4,208,103 issued June 17 1980, such a device is described having a variable electrode made of a 0.00035 cm. thick plastic sheet, namely polyethyleneterephthalate (MYLAR, a Dupont Trademark), carrying a 500 angstrom thick aluminum film on both faces. Electrical connection is made to this film by a conductive epoxy resin joint to a wire lead.

A metallized-plastic variable electrode contacted by a pressure contact is described in my U.S. Pat. No. 4,094,590 issued June 13, 1978. There the end of the fragile variable electrode is crimp clamped to a sheet metal lead.

Such contacts to the delicate variable electrodes in the few electrostatic devices that may for example make up electrically controlled alpha-numeric signs can be adequately reliable.

However, when hundreds and thousands are used to form a matrix, such as a wall TV screen or a large array for displaying airline schedules in an airport lobby, a very high reliability is demanded.

It is therefore an object of this invention to provide a more reliable electrical contact to a delicate resilient variable electrode in an electrically actuated electrostatic device.

It is a further object of this invention to provide such an electrical contact that simultaneously lends itself to simplicity and ease in construction of a large array of interconnected electrostatic devices.

SUMMARY OF THE INVENTION

An electrostatic device, having a fixed and a resilient variable sheet electrode separated by an insulative layer, futher includes an electrical contact comprised of a elastomeric pad fixedly mounted at one side thereof relative to said fixed electrode, a metal terminal also fixedly mounted, and an ancillary extension of the variable sheet electrode. The ancillary extension of the variable electrode is sandwiched between the fixed electrode and pad in compression distending the sheet extension into the elastomeric pad and forming a terminal-to-electrode electrical contact. This contact preferably also includes a thin layer of graphite particles in the sandwich between the terminal and the variable electrode to prevent possible electrochemical reaction that may degrade the contact when the surfaces of the variable electrode and the terminal are of different metals.

The variable-electrode contact of this invention provides a large area of terminal to variable-electrode contact under constant pressure and thus through sheer redundance leads to high reliability. Furthermore, this broad area of contact makes it possible to add a layer of graphite granules in the contact without significantly raising the contact resistance, a particularly important feature when the device is used in a moving picture array, e.g. a wall TV screen, where high speed operation is required of each electrostatic display element. The large area contact also allows a firm even pressure to the delicate variable-electrode sheet. These advantages are fully realized when the terminal has at least one contacting rounded ridge positioned orthogonally to the direction of movement of the variable electrode and extending to at least the full width of the variable electrode.

It is anticipated that unitary assemblies of a plurality of electrostatic display devices in this invention will be constructed minus the terminals, and that a group of such assemblies will be mounted and connected abutting each other on a printed wiring board which board includes the terminals that are simultaneously put into pressure contact with respective of the variable electrodes.

BRIEF DESCRIPTION OF THE DRAWINGS

FIG. 3 is magnified about twenty times relative to the scale of FIG. 1.

DESCRIPTION OF THE PREFERRED EMBODIMENTS

Figure 1:
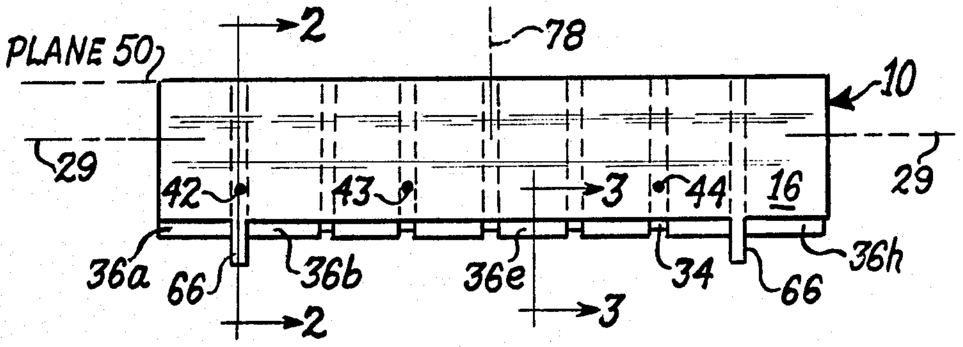
FIG. 1 shows in side view an assembly of eight electrostatic display devices of this invention. This particular assembly is 11 cm. long, left to right.
Figure 2:
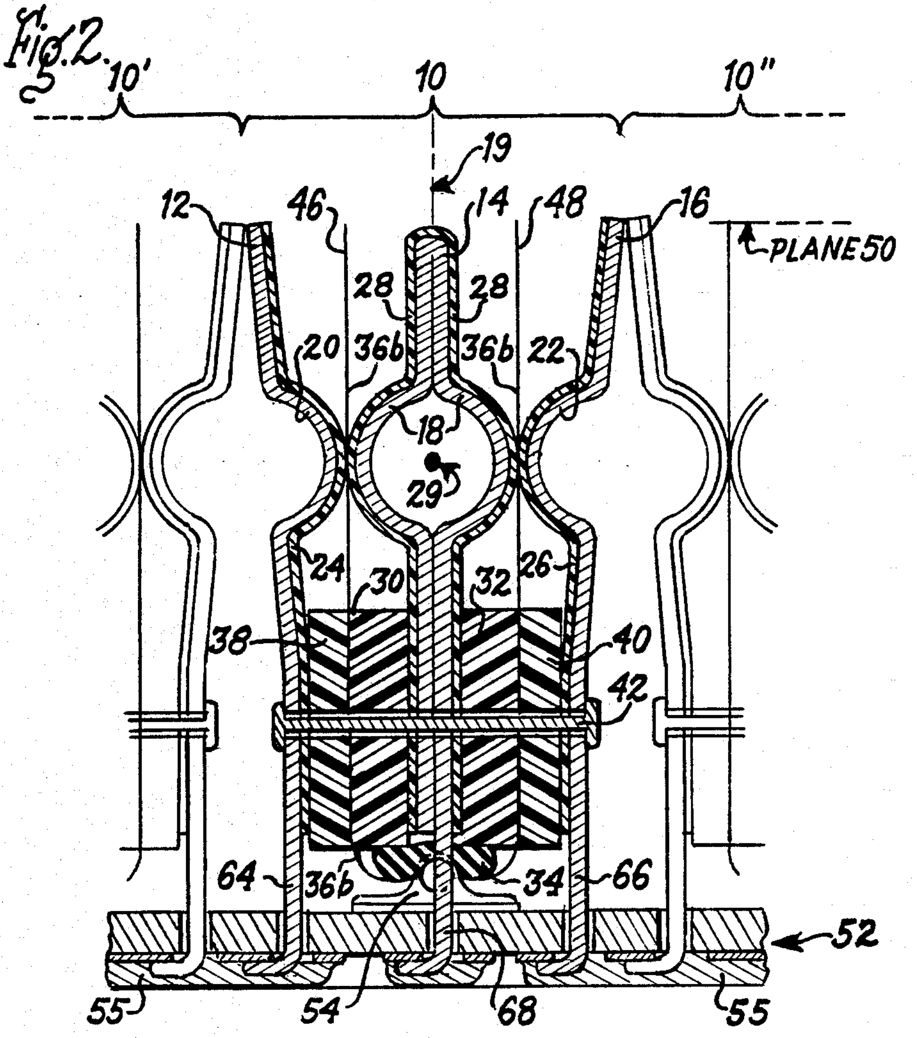
FIG. 2 shows in end sectional view the display devices assembly of FIG. 1 taken in plane 2—2 further mounted to a printed circuit board. The scale of FIG. 2 is about five times greater than that of FIG. 1.

The assembly 10 of eight electrostatic display devices of FIGS. 1 and 2 is made up of preformed brass sheet pieces 12,14, and 16 that as will be seen serve as the fixed electrodes of each and all of the eight display devices. As seen in the end view of FIG. 2, the center piece 14 is formed of a sheet that has two elongated semicircular humps 18 formed in the sheet and the sheet is folded back upon itself so that the humps 18 are coincident and protrude in the direction away from each other relative to the otherwise flat plane 19 formed by the remainder of the sheet. Pieces 12 and 16 each are provided respectively with humps 20 and 22 having the same semicircular geometry.

The free ends e.g. 46 and 48 of each resilient conductive sheet, *36b*, are in the same plane 50 as are the top edges of the fixed electrodes 12, 14 and 16, and are free so that under the influence of electrostatic fields are attracted to and move to either the center fixed electrode 14 or to the outer electrode 12 or 16. Thus each of the resilient conductive sheets *36a* through *36h* is the variable electrode for one of eight electrostatic display devices that make up the assembly 10.

The intended mode of operation is readily explained with reference to the second (from the left in FIG. 1) display device having variable electrode *36b*. This second device is clearly seen in the end view of FIG. 2.

The outer fixed electrodes 12 and 16 are electrically connected together and a voltage is applied between this pair 12 and 16 and the center fixed electrode 14. Now when the variable elctrode 36*b* is electrically connected to the outer pair 12 and 16, then the free ends 46 and 48 are attracted to and lean toward the center electrode 14. When the variable electrode 36*b* is connected electrically to the center electrode 14, then the free ends 46 and 48 of the variable electrode 36*b* are electrostatically attracted and lean to the respective outer fixed electrodes 12 and 16. In the former case, an observer looking down on the second display device as shown in FIGS. 1 and 2 sees only a yellow color and in the later case sees only a blue color. And the device looks more solidly yellow or blue if, as is preferable, both faces of the variable electrodes have a mirror finish.

Each of the three fixed electrodes 12,14, and 16 are coated, at least on their surfaces from which the corresponding humps are convex, with an insulation coating. On electrodes 12 and 16, the insulating coatings 24 and 26 respectively are bright yellow while the insulating coating 28 on the center electrode 14 is a deep blue color.

The assembley 10 having an axis 29 is made by placing two elongated insulative blocks 30 and 32 axially along the outer coated surfaces of the center electrode 14, placing axially an elongated elastomeric strip 34 of sponge rubber along the bottom of the blocks 30 and 32, and placing eight identical rectangular resilient conductive sheets 36*a* through 36*h* over the preassembly consisting of center electrode 18, blocks 30 and 32 and sponge rubber strip 34. Each reislent conductive sheet, e.g. 36*b*, is so bent in the shape of a U and it has two equally high free upper ends.

Two more elongated insulative blocks 38 and 40 of the same shape except a little thinner are also mounted respectively over and registered with blocks 30 and 32 sandwiching on both sides of the center fixed electrode 14 the resilient conductive sheets, e.g. 36*b*.

The fixed electrodes 12 and 16 are then placed with their humps 20 and 22 facing and registered with humps 28 to position within a 3 mil gap each of the eight resilient conductive sheets, e.g. 36*b*, at an axially directed line located between the free ends of and the line of emergence of the sheets, e.g. 36*b*, from the sandwich of the pairs of block i.e. pair 24 and 320 and pair 27 and 32.

Three rivets 42, 43 and 44 are then fed through holes provided in the blocks 38, 30, 32 and 40. These rivets or other clamping means are then set to hold the assembly 10 together. From FIG. 1 it can be seen that rivet 42 passes between conductive sheets 36*a* and 36*b* and likewise the other rivets 43 and 44 do not contact the adjacent conductive sheets.

Figure 3:
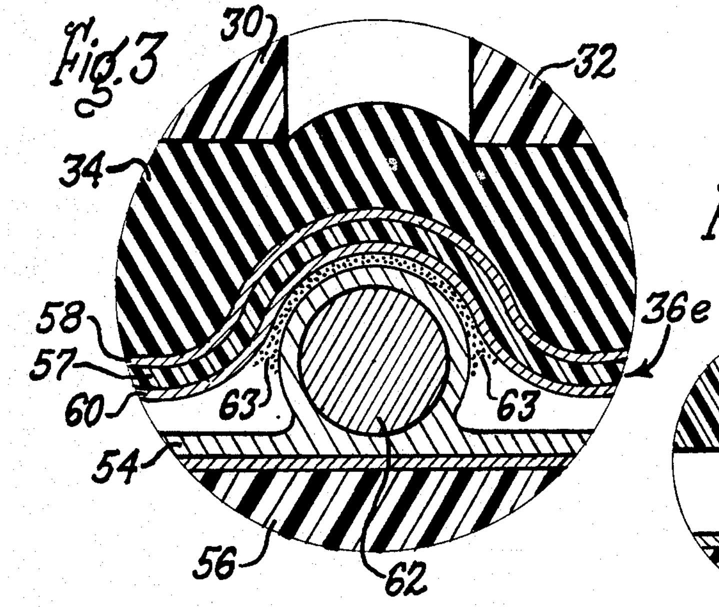
FIG. 3 shows in end sectional view a detail of FIG. 1 taken in plane 3—3 assembled to the printed circuit board.

Referring now to FIG. 2 and the magnified detail of FIG. 3, the assembly 10 is mounted and electrically connected to a standard type printed wiring board 52 having solder coated wiring layers 54 and 55 respectively on the top and bottom surfaces of the insulative board 56. It can be seen in FIG. 3 that the variable electrode 36*e* is a plastic sheet 57 with metal films 58 and 60 formed on the inner face and the outer face respectively. Sheet 57 is of 0.2 mil thick MYLAR having been coated by vacuum metallization with aluminum films 58 and 60 each at about 300 angstroms thickness. This provides the mirror finish that is desired.

The inner film 58 is preferably connected to the outer film 60 and also serves as a mirror. The outer film 60 serves as the main conductive face of the variable electrode 36*e* by which the device is to be electrically activated The mounting and connecting of the assembly 10 is preferably made by soldering a short length of copper wire 62 to each area on the printed wiring board 52 at the anticipated location directly under a variable electrode, and coating both the lower-most, namely the middle portion, of the film 60 and the solder coated wire 62 with a paste containing graphite particles. The length of wire 62 is about equal to the width of the variable electrode, e.g. the distance from edge to edge taken at right angles to the long dimension of the variable electrode, helping to avoid wrinkles extending away from the distended contact area which wrinkles tend to reduce the effective contact area and to degrade the flexibility of the variable electrode. The outer fixed electrodes 12 and 16 each respectively have a pair of finger-like downward extensions 64 and 66. The central fixed electrode 14 has a pair of downward extensions 68. The assembly 10, is placed down on the printed circuit board with the extensions 64, 66 and 68 pushed through corresponding holes 70,72 and 74 respectively provided therefor in the board 52.

A dashed line 76 superimposed on the top view of the board 52 in FIG. 2 indicates the intended position of the assembly 10.

The assembly 10 is then pressed evenly toward the board 52 to force the short solder coated wires, e.g. 62, to push against and distend the variable electrode, e.g. 36*e*, against the elastomeric strip 34. The short tips of the electrodes 64, 66, and 68 that extend beyond the opposite bottom side of the board 52 are bent against the printed wiring on the bottom of the board and soldered in place to mechanically and electrically connect the assembly 10 to the board 52.

Figure 4:
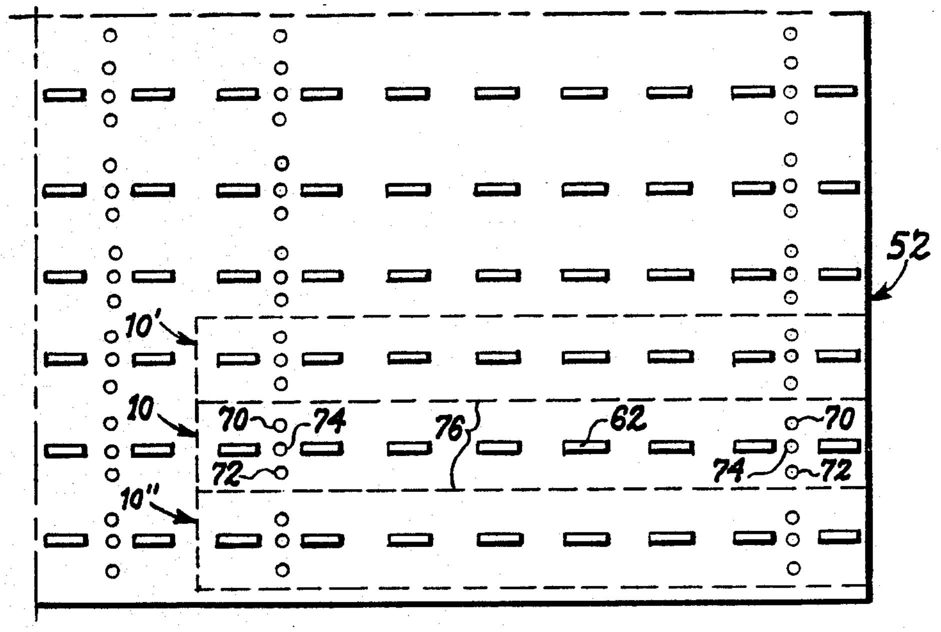
FIG. 4 shows in top plan view a portion of the printed circuit board to which the assembly is shown connected in FIGS. 2 and 3. The scale of FIG. 4 about is the same as that of FIG. 1.

Another electrostatic display assembly of eight independently operable devices identical to assembly 10 can be mounted to the board 52 immediately adjacent to and below (as shown in FIG. 4) the assembly 10 location 76. Another may be mounted above, and yet others above that. Another eight-device assembly may be mounted to the left of and abutting the assembly 10 at position 76. Thus the board 52 when full of display assemblies forms a large array of independently operable display devices arranged in rows and columns. The assemblies may be all simultaneously soldered to board 52 using a standard wave soldering technique.

The particular assembly, 10, is designed so that the thickness of the inner blocks 30 and 32 are about the same dimensions as the elevation of the humps 18 from the plane of the remainder of the center electrode 14. However, the slightly thinner blocks 38 and 40 are less thick than the elevations of the humps 20 and 22 with the result that the variable electrodes, e.g. 36*b* are held loosely to avoid wrinkles within the 3 mil gap, formed by fine ridges (not shown) in abutting fixed electrodes at either side of each variable electrode. Thus the top portions of the outer fixed electrodes 12 and 16 are each tilted slightly outward.

Thus two adjacently mounted assemblies abut at the top edges of those outwardly tilted fixed electrodes and by rotating every other assembly 10 by 180 degrees about verticle axis 78 (FIG. 1), the rivets 42, 43 and 44 of adjacent assemblies will not interfere with each other.

In FIG. 2 adjacent assemblies 10' and 10" are partially and lightly sketched in to show their abuting relationship with the assembly 10 when all are mounted on a printed circuit board such as that of FIG. 4.

Figure 5:
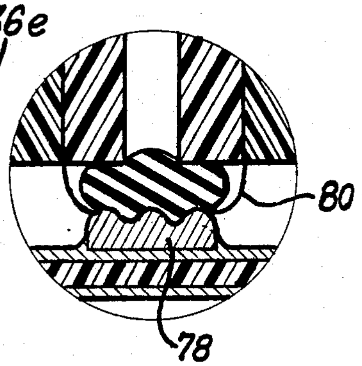
FIG. 5 shows a detail in side sectional view of an alternate terminal construction of this invention.

In the alternate embodiment shown in FIG. 5, a metal block 78 is substituted for the metal conductor 62 of FIG. 3, forming a more extensive contact with a resilient conductive sheet 80 that is the counterpart of the resilient conductive sheet 36e illustrated in FIG. 3.

What is claimed is:

1. An electrostatic device of the kind including a fixed electrode, a variable electrode of a resilient sheet material having at least one conductive face, an insulation layer positioned between said fixed and variable electrodes, said variable electrode having at least one free end normally standing apart from said fixed electrode and having a portion mounted to said fixed electrode, and two electrical contacts respectively at said fixed electrode and at an area of said variable electrode near said mounted portion by which a voltage may be applied between said variable and fixed electrodes for causing said resilient variable electrode to become attracted to said fixed electrode, wherein the improvement comprises:

said variable-electrode contact comprised of an elastomeric pad mounted between said rigid fixed electrode and one face of said contact area of said resilient variable electrode; a fixedly mounted metal terminal having a convex surface making pressure contact with said conducting and opposite face of said contact area so that a central part of said resilient variable electrode area is distended toward and is pressed partially into said elastomeric pad to provide a constant pressure between said distended area part of said conducting variable electrode face and said metal terminal.

2. The electrostatic device of claim 1 wherein said contact is additionally comprised of a layer of graphite particles compressed between said metal terminal and said conductive face of said variable electrode.

3. The electrostatic device of claim 1 additionally comprising a printed wiring board and a plurality of other essentially identical electrostatic devices being mechanically mounted with said electrostatic device of claim 1 on one side of said printed circuit board to form an array of rows and columns of said devices.

4. The electrostatic device of claim 3 wherein said printed circuit board on said devices-mounted side includes an array of raised metal pieces each serving as said electrical contact terminal of one of said mounted devices having been mounted directly over said terminal with the corresponding of said variable electrode-contact areas.

5. An electrostatic device comprising:

a fixed electrode;

a variable electrode of a resilient sheet material having at least one conductive face;

an insulation layer positioned between said fixed and variable electrodes, said variable electrode having at least one free end normally standing apart from said fixed electrode and having a portion mounted to said fixed electrode;

a first electrical contact means for making an electrical connection between said fixed electrode and one electrical terminal; and a second electrical contact means for making an electrical connection between said conductive face of said variable electrode, said second contact means comprising an elastomeric pad having one side fixedly mounted relative to said fixed electrode a region of said variable electrode near said mounted portion thereof extending over said other side of said elastomeric pad with conductive face away from said pad, and a fixedly mounted second metal terminal having a protrusion that is pressed into said conductive face of said variable electrode to distend an area of said resilient variable electrode with said pad and to compress said elastomeric pad in a region thereof opposite said second terminal.

6. The electrostatic device of claim 5 additionally comprising a layer of graphite particles at the interface of said metal terminal and said conductive face of said variable electrode to serve as a conductive spacer therebetween.

7. The electrostatic device of claim 6 wherein said graphite-layer thickness is less than one percent of the average diameter of the distended area of said variable electrode at said terminal so that the contact resistance attributable to said graphite layer is increased insubstantially.

8. The electroststic device of claim 5 wherein said resilient-sheet variable electrode is comprised of a plastic sheet less than about 3 mils thick and a substantially thinner metal film adhered to a surface of said plastic sheet to form said conductive face.

9. The electrostatic device of claim 8 wherein said metal film and the surface of said metal terminal are of two dissimilar base metals.

10. The electrostatic device of claim 9 wherein said metal terminal surface is composed of a tin-lead alloy solder and wherein said metal film is aluminum having a thickness of from about 200 to 5000 angstroms.

* * * * *